United States Patent [19]

Conte

[11] Patent Number: 5,032,075

[45] Date of Patent: Jul. 16, 1991

[54] UNIT TO FORM PELLET ELEMENTS

[75] Inventor: Robert F. I. Conte, Milano, Italy

[73] Assignee: Steel Belt Systems, S.R.L., Milano, Italy

[21] Appl. No.: 453,667

[22] Filed: Dec. 20, 1989

[30] Foreign Application Priority Data

Oct. 13, 1989 [IT] Italy ................................ 22020 A/89

[51] Int. Cl.⁵ ............................................. B29C 41/08
[52] U.S. Cl. ................................... 425/274; 425/438; 425/444; 426/515
[58] Field of Search ................ 425/8, 218, 270, 272, 425/436, 315, 438, 274, 444; 426/515

[56] References Cited

U.S. PATENT DOCUMENTS

| 2,118,438 | 5/1938 | Lawrence et al. | 264/144 |
| 2,327,943 | 8/1943 | Tiers | 264/140 X |
| 3,950,561 | 5/1976 | Collins | 426/515 X |
| 3,963,813 | 6/1976 | Keith | 264/292 X |
| 4,256,581 | 3/1981 | Boman et al. | 425/202 |
| 4,559,000 | 12/1985 | Froeschke | 425/6 |
| 4,578,021 | 3/1986 | Schermutzki | 425/143 X |
| 4,795,604 | 1/1989 | Matsuzaki et al. | 425/6 |

FOREIGN PATENT DOCUMENTS

| 0593501 | 2/1934 | Fed. Rep. of Germany | 425/315 |
| 0642420 | 3/1934 | Fed. Rep. of Germany | 425/315 |
| 3209747 | 9/1983 | Fed. Rep. of Germany . | |
| 0339422 | 4/1936 | Italy | 425/315 |
| 52-35247 | 3/1977 | Japan | 264/292 |
| 52-35248 | 3/1977 | Japan | 264/292 |
| 0889478 | 12/1981 | U.S.S.R. | 425/315 |

Primary Examiner—Jay H. Woo
Assistant Examiner—Robert B. Davis
Attorney, Agent, or Firm—Laff, Whitesel, Conte & Saret

[57] ABSTRACT

The unit has a conveyor belt (5) adapted to receive, transfer and cool the pellet elements, a cylindrical member (2) located above the conveyor belt and rotatable about an axis transverse to the feed direction of the conveyor belt, the peripheral speed of the cylindrical member substantially corresponding to the feed speed of the conveyor belt, at least a ring element (6) engaged in coaxial relation with and at the outside of the cylindrical member and exhibiting a number of projections (9) oriented radially apart from the cylindrical member (2), feed means (12) and dispensing means (14) adapted to distribute material to the fluid state onto the projections (9) and to form drop portions of the same thereon, each of the projections passing in the vicinity of the conveyor belt (5) so as to let one of the drop portions defining one of the pellet elements fall thereon.

9 Claims, 2 Drawing Sheets

UNIT TO FORM PELLET ELEMENTS

FIELD AND BACKGROUND OF THE INVENTION

The present invention relates to a unit to form pellet elements.

It is known that in many industrial processes for example in the chemical and foodstuff fields, the production cycle includes the formation of pellet elements starting from materials which are kept to the fluid state, that is the formation of substantially ball-shaped portions which are transferred and solidified on suitably-cooled conveyor belts.

In some cases the material thus fractionated may be an intermediate product adapted to further workings, but in other cases it already constitutes a final product. The pellet elements are made using various apparatus which substantially can be divided into two different types.

One type of known apparatus involves a series of dispensing nozzles located above the conveyor belt and transversely thereto, which continuously dispense predetermined amounts of material in the form of drops falling onto the conveyor belt surface. This type of apparatus however has serious drawbacks in that the static delivery of the fluid material onto a moving conveyor belt brings about an important deformation of the falling drops. Actually the drops will tend to take an elongate form losing their substantially ball-shaped conformation. In addition, depending upon the viscosity of the material and the conveyor belt feed speed, the separation between subsequent pellets delivered from the same nozzle may not occur.

In order to overcome the drawbacks encountered with this type of apparatus attemps have been made to use a second type of apparatus in which the drops of material are practically distributed onto the conveyor belt by means of movable dispensing holes moving at the same speed as the feed speed of the conveyor belt. This second type of apparatus generally comprises one fixed feeding cylinder the axis of which is transverse to the feed direction of the conveyor belt and which exhibits a number of feed holes along the generatrix of the feeding cylinder itself, at the lowest position thereof. Provided externally and in contact with the feeding cylinder is a second coaxial dispensing cylinder, the peripheral rotational speed of which is substantially coincident with the feed speed of the conveyor belt. Such second dispensing cylinder has a number of suitably spaced apart delivery holes which come in register with the feed holes of the first cylinder and therefore enable the issue of drops of material to the fluid state which do not lose their ball-shaped configuration even when they come in contact with the conveyor belt due to the absence of relative speed between said belt and the delivery holes.

But also this second type of known apparatus has limits and serious drawbacks, although it produces pellet elements of a satisfactory quality.

Actually these known apparatus are of complex and delicate construction and therefore expensive, due to the high precision required in coupling the inner static cylinder to the outer movable one. In addition, if in operation a partial ovalization of one cylinder occurs, the apparatus becomes useless and therefore must be replaced. They also have poor operative flexibility since they are provided with delivery holes spaced apart according to a fixed pitch. Therefore, the amount of fluid material used being equal, it is possible to accomplish pellet elements having only one and the same size.

It is not even possible to adjust the apparatus operation to the varying viscosities of the materials to be made into pellets. If one wishes to make the production of pellet elements suit the different types of fluid materials or make it meet different size requirements, it is necessary to replace the dispensing cylinder, which involves high costs also due to the down time as a result of the needed replacement.

SUMMARY OF THE INVENTION

Under this situation the technical task underlying the present invention is to provide a unit to form pellet elements capable of substantially eliminating the above drawbacks.

Within the scope of this technical task it is an important object of the invention to provide a unit to form pellet elements which is very flexible in operation as regards both the possibility of producing said pellet elements in different varying sizes and the type and viscosity of the material to the fluid state which can be used.

Another important object of the invention is to provide a unit to form pellet elements which is of simple and easy construction and reduced production costs.

A still further object of the invention is to provide a unit to form pellet elements which makes the necessary servicing operations much more easier.

Yet another object of the invention is to provide an embodiment of the invention which is advantageous in itself while representing a technical progress in the specific field.

The technical task and the objects mentioned above, and still further objects which will become more apparent in the following are substantially attained by a unit to form pellet elements including a conveyor belt adapted to receive, transfer and cool said pellet elements, comprising a cylindrical member disposed above said belt and rotatable about an axis transverse to the feed direction of the conveyor belt, said cylindrical member having a peripheral speed substantially corresponding to the feed speed of the belt, at least a ring element engaged in coaxial relation with and at the outside of said cylindrical member and provided with a number of projections oriented radially apart from said cylindrical member, feed members and dispensing members adapted to distribute material to the fluid state onto said projections and to form drop portions of the same thereon, each of said projections passing in the vicinity of the belt so as to let one of the drop portions defining one of said pellet elements fall thereon.

BRIEF DESCRIPTION OF THE DRAWINGS

Further features and advantages of the invention will best be understood from the detailed description of a preferred embodiment of a unit to form pellet elements according to the invention, given hereinafter by way of non-limiting example with reference to the accompanying drawings, in which:

FIG. 3 shows, to an enlarged scale, a construction detail of the unit of the invention according to a second embodiment thereof.

DESCRIPTION OF THE PREFERRED EMBODIMENTS

Figure 1:
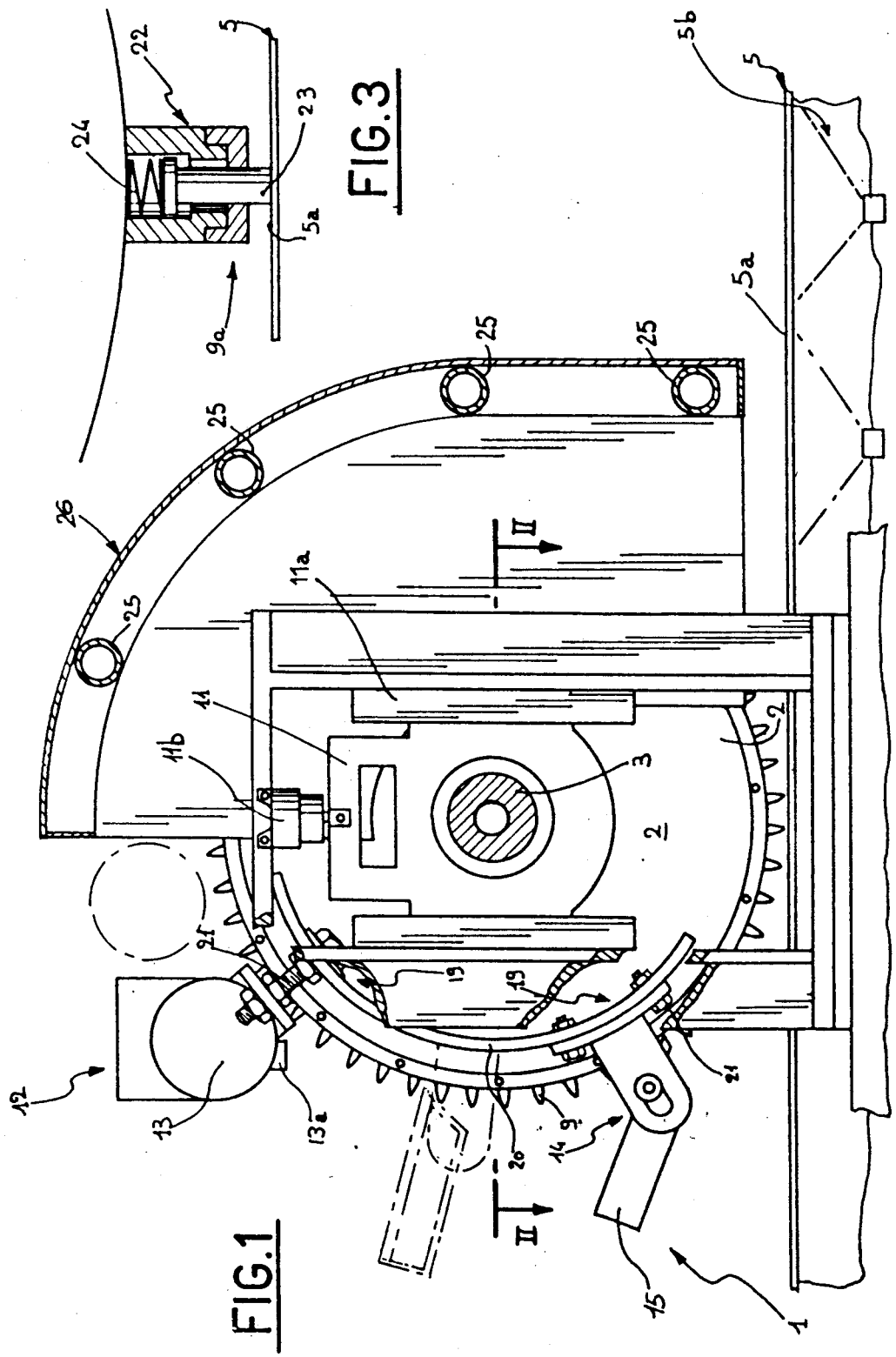
FIG. 1 is an elevation side view partly in section of a unit in accordance with the invention.
Figure 2:
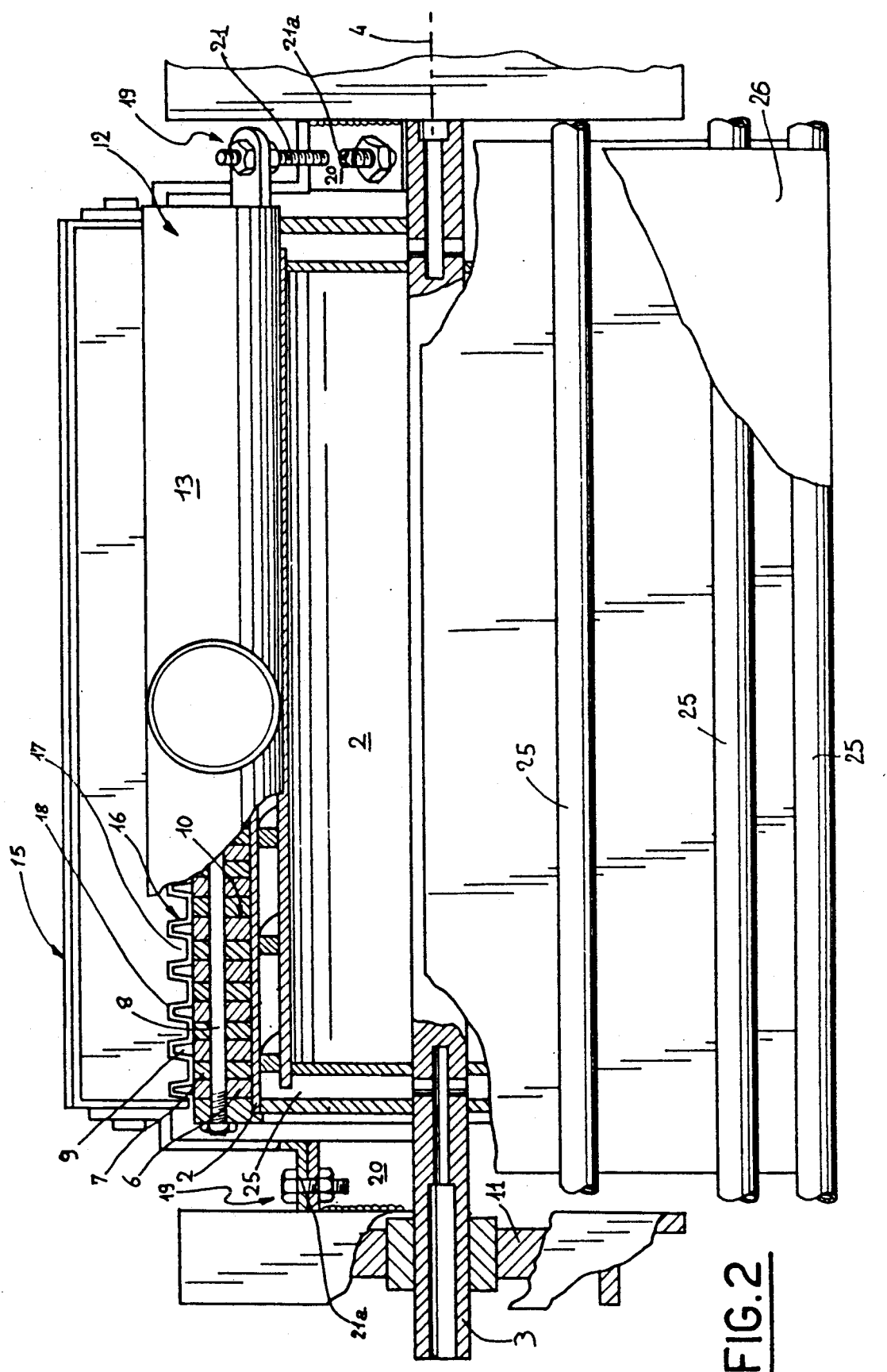
FIG. 2 is a fragmentary section of the unit carried out along line II—II in FIG. 1.

Referring to the drawings, the unit to form pellet elements according to the invention has been generally identified by reference numeral 1. It comprises a cylindrical member 2 supported by a shaft 3 rotating about an axis 4 transverse to the feed direction of a conveyor belt 5. The belt, of known type and located underneath the cylindrical member 2, has a support table 5a made of metal under which cooling means 5b of known type is located. Provided in coaxial relation with the cylindrical member 2 and at the outside of the same are ring elements 6 disposed alongside each other but spaced apart by spacers 7. Through holes suitably bored in the ring elements 6 and spacers 7 are crossed by rods 8 which enable both these elements to be clamped packwise. Each ring element 6 exhibits a number of equidistant projections 9 extending radially substantially in the form of a tooth with triangular profile. Therefore the ring element 6 and the related projections 9 taken as a whole define a ring gear 10.

The shaft 3 is supported by a pair of bearings 11 mounted on fixed guides 11a and vertically movable, being acted upon by fluid-operated cylinders or the like, in order to allow the position of projections 9 to be suitably adjusted so that said projections may pass in the vicinity of the conveyor belt 5.

Provision is also made for feed means 12 disposed externally to the ring gears 10 and spaced apart therefrom, being located at an upper region of the cylindrical member 2. The feed means 12 comprises a dispensing device 13, defined for example by a tube-shaped element through which material to the fluid state, used to form pellet elements, is caused to flow.

The tube-shaped element exhibits, at the lower part thereof, a series of delivery holes 13a aligned along a direction parallel to a generatrix of the cylindrical member 2. In this manner the dispensing device 13 ejects material to the fluid state according to said direction and the material falls down close to each ring gear 10. Dispensing means 14 is located under the feed means 12 and comprises a spatula-shaped element 15 extending parallelly to axis 4. The spatula-shaped element 15 has an indentation 16 partly matching the shape of the projections 9 and comprising ridges 17 and notches 18. Ridges 17 are substantially in contact with spacers 7 and notches 18 surround projections 9 leaving empty spaces in the region of the tips of said projections. In this manner the indentation 16 is adapted to move the material present at the base of the projections 9 and on spacers 7, into said empty spaces where drop portions of the material are formed. Feed means 12 and dispensing means 14 are engaged to the bearing 11 by means of adjustable positioning members 19 comprised of a support guide 20 in the form of an arc of a circle concentric with axis 4 and positioning screws 21 slidable within elongated holes 21a provided in the support guide 20.

Projections 9 can be accomplished in a second embodiment 9a shown in FIG. 3. In this case they are comprised of a sleeve 22 engaged to the ring element 6, a plug 23 radially slidable within the sleeve 22 and a counterspring 24 tending to make the plug 23 elastically emerge from sleeve 22. When the plug 23 is brought into contact with the conveyor belt 5, said belt counteracts the action of spring 24 and tends to make the plug 23 retreat.

Provision is finally made for heating means designed to keep in the liquid state the fluid material used to form said pellet elements and disposed outside and inside the cylindrical member 2. Said heating means comprises circuits 25 through which suitable heating fluids circulate within the cylindrical member 2 and a dome-shaped element 26 surrounding the cylindrical member at least partially.

OPERATION

Operation of the unit to form pellet elements described above mainly as regards structure, is as follows.

After arranging the selected gear rings 10 (the number and type of which must correspond to the production requirements) on the cylindrical member 2, the cylindrical member itself is driven in rotation in known manner and to a peripheral speed corresponding to the feed speed of the conveyor belt 5. The material to the fluid state which is wished to be fractionated into pellet elements is caused to flow into the dispensing device 13 from which it descends by gravity wetting the projections 9 and spacers 7. When the projections 9 pass close to the indentation 16 of the spatula-shaped element 15, the material is moved to the tip of said projections where at each tip a drop is formed due to the known phenomena linked to the surface tension of the liquid.

As each projection 9 passes in the vicinity of the conveyor belt 5, the drop of material carried by the projection itself tends to detach by gravity and it is captured by the upper metal surface of the belt. Orderly rows of pellet elements are therefore formed on the conveyor belt and while moving forward they solidify, also due to the presence of cooling means located underneath the conveyor belt.

According to requirements, it is possible to replace the gear rings 10 provided with equidistant projections having a given pitch with other gear rings having different circumferential pitches. If for example the pitch is reduced and the rotational speed remains unchanged, there is an increase in the frequency of passage of the projections under the feed means 12 and therefore a decrease in the amount of material to the fluid state dispensed onto each projection. Therefore the drop sizes of the next pellet elements become smaller.

It is also possible to modify the distance between the ring gears 10 transversely to the feed direction of the conveyor belt 5 by changing spacers 7, or to stagger the positions of the projections between adjacent ring gears. In this manner the pellet elements can be dropped onto the conveyor belt 5 according to varying positions.

Furthermore, the feed means 12 and dispensing means 14 can be located at different distances from the conveyor belt 5 by acting on the positioning members 19. For example, if the fluid material has a low viscosity it is convenient to locate the feed means 12 closer to the top of the cylindrical member 2 so that the greater length travelled over said member may compensate for the excessive slip velocity.

Finally in case of materials having a high viscosity it is possible to replace the ring gears 10 having triangular tooth-shaped projections 9 with rings the projections 9a of which are of the type shown in FIG. 3. In this case the material to the fluid state wets the plug 23 which is at its outermost projecting position due to the action of the counterspring 24. When each projection 9a has come into contact with the conveyor belt 5, said belt tends to make the plug 23 retreat and the detachment of the material from the outer surface of the plug 23 itself is facilitated.

The invention attains the intended purposes and achieves important advantages.

In particular it will be noted that the easy interchangeability of the ring gears 10 makes their use particularly flexible and adaptable to every production process.

In addition, the material to the fluid state wets the cylindrical member 2 only externally and therefore its cleaning and servicing is much easier.

Finally it will be recognized that the particular embodiment shown is also advantageous in its specific aspects which are apparent from the specification and drawings.

The invention as conceived is susceptible of many modifications and variations, all of them falling within the scope of the inventive idea. All of the details can be replaced by technically equivalent elements. In the practical accomplishment of the invention the materials, forms and sizes can be of any nature and magnitude, according to requirements.

What is claimed is:

1. A unit to form pellet elements, including a conveyor belt to receive, transfer and cool said pellet elements, comprising:
   a cylindrical member disposed above said belt and rotatable about an axis transverse to a feed direction of the conveyor belt, said cylindrical member having a peripheral speed substantially corresponding to a feed speed of said belt,
   a plurality of ring elements engaged in coaxial relation with and at the outside of said cylindrical member and provided with a number of tooth shaped projections integral with and protruding outwardly from said ring elements, said projections being disposed along the circumferential outline of said ring element and being spaced apart from each other,
   feed means to distribute material in a fluid state on said projections, tube shaped element provided at a lower part of said feed means, said tube element having a series of delivery holes aligned parallel to said ring elements to deliver said material close to each projection to form drop portions of materials on said projections,
   dispensing means arranged below said feed means, said dispensing means being formed by a spatula-shaped element extending parallel to the axis of said cylindrical member and having an indentation partly matching the shape of said projections to move the material from a base to a tip of said projection to form said drop portions, whereby each of said tips, passing in the vicinity of the belt, releases one of the drop portions on the belt.

2. The unit as claimed in claim 1, wherein provision is made for a number of said ring elements adapted to be disposed alongside each other and at predetermined mutual distances.

3. The unit as claimed in claim 1, wherein spacers interposed between said ring elements are provided, which are designed to define said mutual distances.

4. The unit as claimed in claim 3, wherein provision is further made for locking tie rods crossing said ring elements and spacers and adapted to clamp both said ring elements and spacers pack-wise.

5. The unit as claimed in claim 1, wherein said projections are disposed along the circumferential outline of said ring element, being spaced apart from each other by the same distance.

6. The unit as claimed in claim 1, wherein adjustable positioning members are provided for said feed means and dispensing means which are adapted to make these means take a number of positions differently spaced apart from said conveyor belt.

7. The unit as claimed in claim 1, wherein said projections substantially extend in the form of a tooth with triangular profile and define a ring gear together with said ring element.

8. The unit as claimed in claim 1, wherein each of said projections comprises:
   a sleeve integral with said ring element,
   a plug radially slidable in said sleeve,
   a counterspring adapted to make the plug elastically emerge from said sleeve, said plug being pushed to the inside of the sleeve when it comes in contact with said conveyor belt.

9. The unit as claimed in claim 1, wherein heating means is provided inside and outside said cylindrical member, which is adapted to keep said fluid material in the liquid state.

* * * * *

UNITED STATES PATENT AND TRADEMARK OFFICE
CERTIFICATE OF CORRECTION

PATENT NO. : 5,032,075
DATED : July 16, 1991
INVENTOR(S) : CONTE

It is certified that error appears in the above-identified patent and that said Letters Patent is hereby corrected as shown below:

ON TITLE PAGE:   Item [19] "Conte" should be --Lisciandra--
                 Item [75] "Robert F. I, Conte" should be
                 --Luigi Lisciandra--.

Signed and Sealed this

Thirty-first Day of March, 1992

Attest:

HARRY F. MANBECK, JR.

*Attesting Officer*   Commissioner of Patents and Trademarks